US010851296B2

(12) United States Patent
Suzuki (10) Patent No.: US 10,851,296 B2
(45) Date of Patent: Dec. 1, 2020

(54) FLUORESCENT MATERIAL HAVING A COMPOSITION OF RARE EARTH ALUMINUM-GALLATE

(71) Applicant: NICHIA CORPORATION, Anan (JP)

(72) Inventor: Tomokazu Suzuki, Tokushima (JP)

(73) Assignee: NICHIA CORPORATION, Anan-shi (JP)

( * ) Notice: Subject to any disclaimer, the term of this patent is extended or adjusted under 35 U.S.C. 154(b) by 212 days.

(21) Appl. No.: 15/599,021

(22) Filed: May 18, 2017

(65) Prior Publication Data

US 2017/0342322 A1 Nov. 30, 2017

(30) Foreign Application Priority Data

May 30, 2016 (JP) ................................. 2016-107193

(51) Int. Cl.
*C09K 11/77* (2006.01)
(52) U.S. Cl.
CPC ................................ *C09K 11/7774* (2013.01)
(58) Field of Classification Search
CPC .................................................. C09K 11/7774
See application file for complete search history.

(56) References Cited

U.S. PATENT DOCUMENTS

| 2004/0256974 | A1 | 12/2004 | Mueller-Mach et al. |
| 2006/0158097 | A1 | 7/2006 | Juestel et al. |
| 2009/0151785 | A1 | 6/2009 | Naum et al. |
| 2012/0175658 | A1* | 7/2012 | Tsukatani ............ C01F 17/0025 257/98 |

FOREIGN PATENT DOCUMENTS

| JP | 2006520836 A | 9/2006 |
| JP | 2010-097829 A | 4/2010 |
| WO | 2015-029284 A1 | 3/2015 |

OTHER PUBLICATIONS

Moller. Determination of vis and NIR quantum yields of Nd3+-activated garnets sensitized by Ce3+. Journal of Luminescence 158 (2015) 365-370 (Year: 2015).*
N.S. Sawala et al., "Spectral downshifting from blue to near infer red region in Ce3+-Nd3+ co-doped YAG phosphor." Infrared Physics & Technology, vol. 77 p. 480-484, Jul. 2016.

(Continued)

*Primary Examiner* — Matthew E. Hoban
(74) *Attorney, Agent, or Firm* — Hunton Andrews Kurth LLP (57) ABSTRACT

Provided is a fluorescent material having a composition of rare earth aluminum-gallate, which radiates light in not only a visible light region but also a near-infrared region and has improved light emission intensity in a near-infrared region. The fluorescent material has a composition of rare earth aluminum-gallate, including at least one rare earth element Ln selected from the group consisting of Y, Gd, Sc, Lu, and La; at least one element selected from Al and Ga; Ce; and Nd. When a total molar composition ratio 5 of Al and Ga is used as a basis, a total molar ratio of Ln, Ce, and Nd is 3; a molar ratio of Ce is a product of 3 and a value of a parameter x; a molar ratio of Nd is a product of 3 and a value of a parameter y. The parameter x is in a range of 0.03 or more and 0.015 or less. The parameter y is in a range of 0.002 or more and 0.06 or less.

8 Claims, 1 Drawing Sheet

(56) References Cited

OTHER PUBLICATIONS

S. Moller et al., "Determination of vis and NIR quantum yields of ND3+-activated garnets sensitized by Ce3+" Journal of Luminescence, 158 (2015) p. 365-370.

Q. Wang et al., "Optical properties of Ce3+-Nd3+ co-doped YAG nanoparticles for visual and near-infrared biological imaging," Spectrochimica Acta Part A: Molecular and Biomolecular Spectroscopy, 149 (2015) p. 898-903.

* cited by examiner

FLUORESCENT MATERIAL HAVING A COMPOSITION OF RARE EARTH ALUMINUM-GALLATE

CROSS-REFERENCE TO RELATED APPLICATION

This application claims benefit of Japanese Patent Application No. 2016-107193 filed on May 30, 2016, the disclosure of which is hereby incorporated reference in its entirety.

BACKGROUND

Technical Field

The present disclosure relates to a fluorescent material having a composition of rare earth aluminum-gallate.

Description of Related Art

A variety of light emitting devices including a light source, such as a light emitting diode (LED) chip, in combination with a fluorescent material have been developed. For example, light emitting devices emitting a white color, a bulb color, an orange color, or the like, through a combination of an LED chip emitting blue light with a fluorescent material emitting yellow light or the like have been developed. Such light emitting devices are used in a variety of fields inclusive of an LED display light source, a backlight light source, a light source for lighting systems, and so on.

As a fluorescent material, which, when receiving blue light from an LED chip, is excited to emit yellow light, a cerium-activated rare earth aluminate fluorescent material having a garnet structure, for example, $Y_3Al_5O_{12}$:Ce (YAG: yttrium aluminum garnet), is known.

A light emitting device using such a fluorescent material is in general one radiating light in a visible light region but not one radiating light in an infrared region, which has hitherto been used as a lighting light source for automobiles, such as a discharge lamp and a halogen lamp. Thus, such a fluorescent matter cannot melt snow or ice attached to the lamp. Japanese Unexamined Patent Publication No. 2010-097829 discloses a light emitting device including a fluorescent material radiating light in a visible light region in combination with a fluorescent material emitting light in a near-infrared region so as to make it possible to also exhibit a snow melting function and discloses the use of, as the fluorescent material emitting light in a near-infrared region, a fluorescent material having Ce and Er added to a YAG-based crystal.

SUMMARY

In recent years, in a variety of fields inclusive of lighting systems having a snow melting function, sensor systems having a sensitivity in a near-infrared region in security systems or the like, lighting systems for plant growth or cultivation, and so on, there has been a demand for the development of fluorescent materials in which, when receiving light from an LED chip, the light emission intensity in not only a visible light region but also a near-infrared region is improved.

However, the rare earth aluminate fluorescent material disclosed in Japanese Unexamined Patent Publication No. 2010-097829 is not satisfactory in the light emission intensity in a near-infrared region.

An object of the present disclosure is to provide a fluorescent material having a composition of rare earth aluminum-gallate, which radiates light in a near-infrared region and has improved light emission intensity in a near-infrared region. Measures for solving the aforementioned problems are as follows. The present disclosure includes the following embodiments.

An embodiment of the present disclosure relate to a fluorescent material having a composition of rare earth aluminum-gallate, including at least one rare earth element Ln selected from the group consisting of Y, Gd, Sc, Lu, and La; at least one element selected from Al and Ga; Ce; and Nd. When a total molar ratio 5 of Al and Ga is used as a basis, a total molar ratio of Ln, Ce, and Nd is 3; a molar ratio of Ce is a product of 3 and a value of a parameter x; and a molar ratio of Nd is a product of 3 and a value of a parameter y. The parameter x is in a range of 0.003 or more and 0.015 or less. The parameter y is in a range of 0.002 or more and 0.06 or less.

In accordance with an embodiment of the present disclosure, it is possible to provide a fluorescent material having a composition of rare earth aluminum-gallate, which radiates light in not only a visible light region but also a near-infrared region and has improved light emission intensity in a near-infrared region.

DETAILED DESCRIPTION

The fluorescent material according to the present invention is hereunder described on a basis of the embodiments and examples. The fluorescent materials as shown below are those for practicing the technical concept of the present invention, and the scope of the present invention is not limited to those shown below.

In the specification, a numerical value range expressed using "A to B" denotes a range including numerical values before and after "to" as a minimum value and a maximum value, respectively. The relationship between the color name and the chromaticity coordinate, the relationship between the wavelength range of light and the color name of monochromic light, and the like are in accordance with JIS Z8110. In addition, in the specification, the near-infrared region refers to a wavelength region of 780 to 3,000 nm.

An embodiment of the present disclosure is concerned with a fluorescent material having a composition of rare earth aluminum-gallate, including at least one rare earth element Ln selected from the group consisting of Y, Gd, Sc, Lu, and La; at least one element selected from Al and Ga; Ce; and Nd. When a total molar ratio 5 of Al and Ga is used as a basis, a total molar ratio of Ln, Ce, and Nd is 3; a molar ratio of Ce is a product of 3 and a value of a parameter x; and a molar ratio of Nd is a product of 3 and a value of a parameter y. The parameter x is in a range of 0.003 or more and 0.015. The parameter y is in a range of 0.002 or more and 0.06 or less.

The fluorescent material having a composition of rare earth aluminum-gallate as an embodiment of the present disclosure contains, in a crystal structure of rare earth aluminum-gallate, cerium (Ce) and neodymium (Nd) in a predetermined molar ratio. Due to these two activating elements (i.e., Ce and Nd), a fluorescent material, which absorbs light of from ultraviolet rays to light in a short wavelength-side region of visible light, has a maximum peak of a light emission spectrum in a near-infrared wavelength region of 780 nm or more and 1,600 nm or less, and has improved light emission intensity in a near-infrared region, can be provided. In the specification, the fluorescent material having a maximum peak of the light emission spectrum in a near-infrared wavelength region of 780 nm or more and 1,600 nm or less is sometimes referred to as "near-infrared light emitting fluorescent material". Specifically, the light in a short wavelength-side region of visible light is light having a light emission peak wavelength in a wavelength region of 380 nm or more and 500 nm or less.

The parameter x is in a range of 0.003 or more and 0.015 or less, preferably in a range of 0.004 or more and 0.012 or less, and more preferably in a range of 0.005 or more and 0.010 or less. In the fluorescent material having a composition of rare earth aluminum-gallate, the parameter x is the activation amount of Ce. When the parameter x does not fall within the predetermined range, the light emission intensity of the fluorescent material in the near-infrared region is lowered. The reason for this may be considered as follows. In the aforementioned fluorescent material having a composition of rare earth aluminum-gallate, in the case where the parameter x is less than 0.003, the amount of Ce contained in the crystal structure of the fluorescent material is small, and therefore, the absorption of excitation energy by Ce is deteriorated. As a result, the energy amount of movement of from Ce to Nd becomes small, and the light emission originated from Nd is lowered, too. In the aforementioned fluorescent material, in the case where the parameter x representing the activation amount of Ce is more than 0.015, the amount of Ce to be incorporated into the crystal structure is excessively large, so that the light emission intensity is lowered due to an influence of concentration quenching generated due to an increase of the frequency of energy transmission which does not participate in the light emission between adjacent Ce ions to each other. Furthermore, in the aforementioned fluorescent material, when the parameter x representing the activation amount of Ce is large as more than 0.015, the crystallinity of the garnet crystal structure of the fluorescent material serving as a matrix is lowered, and as a result, the light emission intensity is lowered.

The parameter y is in a range of 0.002 or more and 0.06 or less, preferably in a range of 0.004 or more and 0.040 or less, and more preferably in a range of 0.005 or more and 0.030 or less. In the fluorescent material having a composition of rare earth aluminum-gallate, the parameter y is the activation amount of Nd. In a fluorescent material in which the parameter y is less than 0.002 or more than 0.06 together with the parameter x representing the activation amount of Ce, the light emission intensity in the near-infrared region is lowered. The reason for this may be considered as follows. In the aforementioned fluorescent material having a composition of rare earth aluminum-gallate, in the case where y representing the activation amount of Nd is less than the predetermined number, the amount of Nd serving as a center of the light emission of the fluorescent material is small, so that the light emission intensity is lowered. In the aforementioned fluorescent material, in the case where the parameter y representing the activation amount of Nd is more than the predetermined number, the amount of Nd to be incorporated into the crystal structure is excessively large, so that the light emission intensity is lowered due to an influence of concentration quenching generated due to an increase of the frequency of energy transmission which does not participate in the light emission between adjacent Nd ions to each other.

In an embodiment of the present disclosure, in order to radiate light in the near-infrared region, the rare earth element Ln is preferably at least one element selected from the group consisting of Y, Gd, Sc, and Lu. The rare earth element Ln may be a single element or may be two or more elements thereof. The rare earth element Ln preferably contains Y or Lu and more preferably contains Y.

It is preferred that the fluorescent material, according to an embodiment of the present disclosure, has a composition represented by the following formula (I).

$$(Ln_{1-x-y}Ce_xNd_y)_3(Al_{1-z}Ga_z)_5O_{12} \qquad (I)$$

wherein Ln is at least one rare earth element selected from the group consisting of Y, Gd, Sc, Lu, and La; and x, y, and z are numbers satisfying $0.003 \leq x \leq 0.015$, $0.002 \leq y \leq 0.06$, and $0 \leq z \leq 0.8$.

The parameter x is the activation amount of Ce and is a number satisfying more preferably $0.004 \leq x \leq 0.012$, and still more preferably $0.005 \leq x \leq 0.010$. The parameter y is the activation amount of Nd and is a number satisfying more preferably $0.004 \leq y \leq 0.040$, and still more preferably $0.005 \leq y \leq 0.030$. The fluorescent material in which the activation amount the parameter x of Ce is the number satisfying $0.003 \leq x \leq 0.015$ is able to enhance the light emission intensity in the near-infrared region of 780 to 1,600 nm. In addition, the fluorescent material in which the activation amount the parameter y is the number satisfying $0.002 \leq y \leq 0.06$ is able to enhance the light emission intensity in the near-infrared region. When the range of the activation amount the parameter x of Ce and the range of the activation amount the parameter y of Nd fall within the aforementioned numerical value ranges, respectively, the activation amounts of the elements serving as light emission centers, which are contained in the crystal structure of the fluorescent material, fall within the optimum ranges, whereby a lowering of the light emission intensity to be caused due to a decrease of the light emission centers can be suppressed, and conversely, a lowering of the light emission intensity to be caused due to concentration quenching generated due to an increase of the activation amounts can be suppressed. The parameter z represents the amount of Ga contained in the fluorescent material in place of Al, and when the parameter z satisfies $0 \leq z \leq 0.8$, and preferably $0 \leq z \leq 0.6$, a lowering of crystallinity of the garnet crystal structure of the fluorescent material serving as a matrix can be suppressed.

In an embodiment of the present disclosure, the rare earth element Ln may be two kinds of rare earth elements Ln1 and Ln2 selected from the group consisting of Y, Gd, Sc, Lu, and La.

In the case where the rare earth element Ln is two kinds of rare earth elements Ln1 and Ln2, from the viewpoints of stability of the crystal structure and an improvement of the light emission intensity in the near-infrared region, it is preferred that a molar composition ratio of the rare earth element Ln1 is larger than a molar composition ratio of the rare earth element Ln2. Furthermore, in the case where Ln1 is Y, Ln2 is preferably Gd, Sc, or Lu, and Ln2 is more preferably Gd. In the case where Ln1 is Lu, Ln2 is preferably Gd. Specifically, a molar ratio of the rare earth element Ln1 and the rare earth element Ln2 (Ln1/Ln2) is preferably in a range of 99/1 or less and 51/49 or more. The molar ratio of the rare earth elements Ln1 and Ln2 (Ln1/Ln2) is more preferably in a range of 98/2 or less and 52/48 or more, and still more preferably in a range of 95/5 or less and 55/45 or more. In the case of containing two kinds of the rare earth elements Ln1 and Ln2, when the molar ratio of Ln1 and Ln2 falls within the aforementioned range, it may be considered that the energy movement of from Ce to Nd is efficiently conducted, and hence, the light emission intensity of the fluorescent material is improved.

When a total molar ratio of the Ln1, the Ln2, Ce, and Nd is defined as 3, and a molar ratio of the Ln2 is defined as the product of 3 and a value of a parameter w, it is preferred that the parameter w be in a range of 0.01 or more and 0.5 or less. In the case where the rare earth element Ln contained in the matrix crystal is a mixed crystal of two kinds of the rare earth element Ln1 and the rare earth element Ln2, in particular, Ln1 is the parameter Y or Lu, and Ln2 is Gd, when the parameter w representing the amount of a single kind of the rare earth element Ln2 of two kinds of the rare earth elements activated with Ce and Nd is in a range of 0.01 or more and 0.5 or less, the light emission having a broad spectrum waveform originated from Ce having absorbed light from the excitation light source shifts to the long wavelength side, and the movement of energy of from Ce to Nd becomes easy, so that it may be considered that the energy movement of from Ce to Nd is efficiently conducted. Therefore, the light emission intensity of the fluorescent material can be more improved.

In addition, in the fluorescent material, according to an embodiment of the present disclosure, in the case where the rare earth element Ln contained in the matrix crystal is a mixed crystal of two kinds of the rare earth element Ln1 and the rare earth element Ln2, the atomic arrangement of the matrix crystal becomes random to some extent, and a proportion of the excitation energy from the excitation light source, which is used for bright line spectrum light emission originated from Nd, increases, the light emission intensity of the fluorescent material can be more improved.

In an embodiment of the present disclosure, in the case where the rare earth element Ln is two kinds of the rare earth element Ln1 and the rare earth element Ln2, each of which is selected from the group consisting of Y, Gd, Sc, Lu, and La, a fluorescent material having a composition represented by the following formula (II) is preferred. In the case of having the composition represented by the following formula (II), a lowering of the light emission originated from Nd can be suppressed.

$(Ln1_{1-x-y}Ln2_wCe_xNd_y)_3(Al_{1-z}Ga_z)_5O_{12}$ (II)

wherein Ln1 is at least one rare earth element selected from the group consisting of Y, Gd, Sc, Lu, and La, and Ln2 is at least one rare earth element selected from the group consisting of Y, Gd, Sc, Lu, and La, provided that Ln1 and Ln2 are an element different from each other; and w, x, y, and z are numbers satisfying $0.01 \leq w \leq 0.5$, $0.003 \leq x \leq 0.015$, $0.002 \leq y \leq 0.06$, and $0 \leq z \leq 0.8$.

In an embodiment of the present disclosure, in the case where the rare earth element Ln contains two kinds of the rare earth element Ln1 and the rare earth element Ln2, Ln1 is Y, and Ln2 is at least one rare earth element selected from the group consisting of Gd, Sc, and Lu, a fluorescent material having a composition represented by the following formula (II-1) is preferred. In the case of having the composition represented by the following formula (II-1), it may be considered that the energy movement of from Ce to Nd is efficiently conducted, and a proportion of the excitation energy from the excitation light source, which is used for bright line spectrum light emission originated from Nd, increases, and therefore, a lowering of the light emission originated from Nd is suppressed, and the light emission intensity of the fluorescent material can be more improved.

$(Ln1_{1-w-x-y}Ln2_wCe_xNd_y)_3(Al_{1-z}Ga_z)_5O_{12}$ (II-1)

wherein Ln1 is Y; Ln2 is at least one rare earth element selected from the group consisting of Gd, Sc, and Lu; and w, x, y, and z are numbers satisfying $0.01 \leq w \leq 0.5$, $0.003 \leq x \leq 0.015$, $0.002 \leq y \leq 0.06$, and $0 \leq z \leq 0.8$.

In an embodiment of the present disclosure, in the case where the rare earth element Ln contains two kinds of the rare earth element Ln1 and the rare earth element Ln2, Ln1 is Lu, and Ln2 is Gd, a fluorescent material having a composition represented by the following formula (II-2) is preferred. In the case of having the composition represented by the following formula (II-2), it may be considered that the energy movement of from Ce to Nd is efficiently conducted, and a proportion of the excitation energy from the excitation light source, which is used for bright line spectrum light emission originated from Nd, increases, and therefore, a lowering of the light emission originated from Nd is suppressed, and the light emission intensity of the fluorescent material can be more improved.

$(Ln1_{1-w-x-y}Ln2_wCe_xNd_y)_3(Al_{1-z}Ga_z)_5O_{12}$ (II-2)

wherein Ln1 is Lu; Ln2 is Gd; and w, x, y, and z are numbers satisfying $0.01 \leq w \leq 0.5$, $0.003 \leq x \leq 0.015$, $0.002 \leq y \leq 0.06$, and $0 \leq z \leq 0.8$.

In the formula (II), the formula (II-1), or the formula (II-2), the parameter w represents the amount of a single kind of the rare earth element Ln2 in a mixed crystal containing two kinds of the rare earth elements, and the parameter w is a number satisfying more preferably $0.02 \leq w \leq 0.48$, and still more preferably $0.03 \leq w \leq 0.45$. The parameter x is the activation amount of Ce and is a number satisfying more preferably $0.004 \leq x \leq 0.012$, and still more preferably $0.005 \leq x \leq 0.010$. The parameter y is the activation amount of Nd and is a number satisfying more preferably $0.004 \leq y \leq 0.040$, and still more preferably $0.005 \leq y \leq 0.030$. The fluorescent material in which the activation amount the parameter x of Ce is in a number satisfying $0.003 \leq x \leq 0.015$ is able to enhance the light emission intensity in the near-infrared region of 780 to 1,600 nm. In addition, the fluorescent material in which the activation amount y of Nd is in a number satisfying $0.002 \leq y \leq 0.06$ is able to enhance the light emission intensity in the near-infrared region. When the range of the activation amount the parameter x of Ce and the range of the activation amount y of Nd fall within the aforementioned numerical ranges, respectively, the amount of the activation agent serving as a light emission center contained in the crystal structure of the fluorescent material falls within the optimum range, whereby a lowering of the light emission intensity to be caused due to a decrease of the light emission center can be suppressed, and conversely, a lowering of the light emission intensity to be caused due to concentration quenching generated due to an increase of the amount of the activation agent can be suppressed. The parameter z represents the amount of Ga contained in the fluorescent material in place of Al, and when the parameter z satisfies $0 \leq z \leq 0.8$, and preferably $0 \leq z \leq 0.6$, a lowering of crystallinity of the garnet crystal structure of the fluorescent material serving as a matrix can be suppressed.

Method of Producing a Fluorescent Material Having a Composition of Rare Earth Aluminum-Gallate As a method for producing a fluorescent material having a composition of rare earth aluminum-gallate according to an embodiment of the present disclosure, the following method is exemplified.

In the method, respective raw materials including a compound containing at least one rare earth element Ln selected from the group consisting of Y, Gd, Sc, La, and Lu, a compound containing at least element selected from Al and Ga, a compound containing Ce, and a compound containing Nd are mixed such that, when a total molar composition ratio 5 of Al and Ga is used as a basis, in the case where a total molar composition ratio of Ln, Ce, and Nd is 3, a molar composition ratio of Ce is a product of 3 and x, and a molar composition ratio of Nd is a product of 3 and y, x is 0.003 or more and 0.015 or less, and y is 0.002 or more and 0.06 or less, to obtain a raw material mixture, and this raw material mixture is heat-treated, followed by classification or the like to obtain a fluorescent material having a composition of rare earth aluminum-gallate.

Compound Containing a Rare Earth Element

Examples of the compound containing a rare earth element include an oxide, a hydroxide, a nitride, an oxynitride, a fluoride, and a chloride, each containing at least one rare earth element Ln selected from the group consisting of Y, Gd, Sc, Lu, and La. Such a compound may be a hydrate. Among the compounds containing a rare earth element, a metal elemental substance or an alloy containing a rare earth element may also be used as at least a part thereof.

Specifically, examples of the compound containing a rare earth element include $Y_2O_3$, $Y(OH)_3$, YN, $YF_3$, $YCl_3$, $Gd_2O_3$, $Gd(OH)_3$, GdN, $GdF_3$, $GdCl_3$, $Sc_2O_3$, ScN, $ScF_3$, $ScCl_3$, $Lu_2O_3$, $LuF_3$, $LuCl_3$, $La_2O_3$, $La(OH)_3$, $LaF_3$, and $LaCl_3$. The compound containing a rare earth element may be used alone, or may be used in combination of two or more thereof. The compound containing a rare earth element is preferably an oxide. This is because, when compared to other materials, the oxide does not contain any other element than the desired composition of rare earth aluminum-gallate.

Compound Containing Al or Ga

Examples of the compound containing at least one element selected from Al and Ga include an oxide, a hydroxide, a nitride, an oxynitride, a fluoride, and a chloride, each containing aluminum or gallium. Such a compound may be a hydrate. As the compound containing aluminum or gallium, an aluminum metal elemental substance, a gallium metal elemental substance, an aluminum alloy, or a gallium alloy may be used, and a metal elemental substance or alloy may also be used in place of at least a part of the compound.

Specifically, examples of the compound containing Al or Ga may include $Al_2O_3$, $Al(OH)_3$, AlN, AlON, $AlF_3$, $AlCl_3$, $Ga_2O_3$, $Ga(OH)_3$, GaN, $GaF_3$, and $GaCl_3$. The compound containing Al or Ga may be used alone, or may be used in combination of two or more thereof. The compound containing at least one element selected from Al and Ga is preferably an oxide. The reason for this resides in the matter that, when compared to other materials, the oxide does not contain any other element than the desired composition of rare earth aluminum-gallate, and the fluorescent material having a desired composition is readily obtainable. In addition, in the case of using a compound containing any other element than the desired composition, there is a case where a residual impurity element is existent in the resulting fluorescent material, and there is a concern that this residual impurity element becomes a killer element with respect to the light emission, resulting in a remarkable lowering of the light emission intensity.

Compound Containing Ce

Examples of the compound containing Ce include an oxide, a hydroxide, a nitride, a fluoride, and a chloride, each containing cerium. Such a compound may be a hydrate. As the compound containing cerium, a cerium metal elemental substance or a cerium alloy may be used, and a metal elemental substance or alloy may also be used in place of at least a part of the compound.

Specifically, examples of the compound containing Ce may include $CeO_2$, $Ce(OH)_2$, $Ce(OH)_4$, CeN, $CeF_3$, and $CeCl_3$. The compound containing Ce may be used alone, or may be used in combination of two or more thereof. The compound containing Ce is preferably an oxide. The reason for this resides in the matter that, when compared to other materials, the oxide does not contain any other element than the desired composition of rare earth aluminum-gallate, and the fluorescent material having a desired composition is readily obtainable. In addition, in the case of using a compound containing any other element than the desired composition, there is a case where a residual impurity element is existent in the resulting fluorescent material, and there is a concern that this residual impurity element becomes a killer element with respect to the light emission, resulting in a remarkable lowering of the light emission intensity.

Compound Containing Nd

Examples of the compound containing Nd include an oxide, a hydroxide, a nitride, a fluoride, and a chloride, each containing neodymium, and the like. Such a compound may be a hydrate. As the compound containing neodymium, a neodymium metal elemental substance or a neodymium alloy may be used, and a metal elemental substance or alloy may also be used in place of at least a part of the compound.

Specifically, examples of the compound containing Nd may include $Nd_2O_3$, $Nd(OH)_3$, NdN, $NdF_3$, and $NdCl_3$. The compound containing Nd may be used alone, or may be used in combination of two or more thereof. The compound containing Nd is preferably an oxide. The reason for this resides in the matter that, when compared to other materials, the oxide does not contain any other element than the desired composition of rare earth aluminum-gallate, and the fluorescent material having a desired composition is readily obtainable. In addition, in the case of using a compound containing any other element than the desired composition, there is a case where a residual impurity element is existent in the resulting fluorescent material, and there is a concern that this residual impurity element becomes a killer element with respect to the light emission, resulting in a remarkable lowering of the light emission intensity.

The raw material mixture may contain a flux, such as a halide, as the need arises. When the flux is contained in the raw material mixture, the reaction among the raw materials is promoted, and a solid phase reaction is easy to be advanced more uniformly. As for this matter, it may be considered that the temperature at which the raw material mixture is heat-treated is substantially the same as or higher than the formation temperature of a liquid phase of a halide or the like to be used as the flux, so that the reaction is promoted.

Examples of the halide include fluorides or chlorides of a rare earth metal, an alkaline earth metal, or an alkali metal. In the case where a halide of a rare earth metal is used as the flux, the flux can also be added as the compound such that the product has a desired composition of rare earth aluminum-gallate. Specifically, examples of the flux include barium fluoride ($BaF_2$) and calcium fluoride ($CaF_2$). The flux is preferably barium fluoride ($BaF_2$). This is because by using barium fluoride as the flux, the garnet crystal structure becomes stable, and a composition of the garnet crystal structure is readily formed.

In the case where the raw material mixture contains the flux, the content of the flux is preferably 20% by mass or less, and more preferably 10% by mass or less, and preferably 0.1% by mass or more on the basis of the raw material mixture (100% by mass). This is because when the content of the flux falls within the aforementioned range, the matter that the garnet crystal structure is hardly formed due to insufficient particle growth because of a small amount of the flux is not generated, and the matter that the garnet crystal structure is hardly formed because of an excessive amount of the flux is not generated.

As for the raw material mixture, after weighing the respective raw materials in a desired blending ratio, for example, the raw materials may be ground and mixed using a dry grinder, such as a ball mill, a vibration mill, a hammer mill, a roll mill, and a jet mill; may be ground and mixed using a mortar and a pestle; may be mixed using a mixing machine, for example, a ribbon blender, a Henschel mixer, a V type blender, etc.; or may be ground and mixed using both a dry grinder and a mixing machine. In addition, the mixing may be achieved by means of either dry mixing or wet drying upon addition of a solvent. The mixing is preferably dry mixing. This is because, when compared to the wet mode, the dry mode enables the process time to be shortened, leading to an improvement in productivity.

The raw material mixture can be heat-treated by charging in a crucible or a boat made of, as a material, a carbon material, such as graphite, boron nitride (BN), aluminum oxide (alumina), tungsten (W), or molybdenum (Mo).

From the viewpoint of stability of the crystal structure, the temperature at which the raw material mixture is heat-treated is preferably in a range of 800° C. or higher and 1,800° C. or lower, more preferably in a range of 900° C. or higher and 1, 750° C. or lower, still more preferably in a range of 1,000° C. or higher and 1,700° C. or lower, and especially preferably in a range of 1,100° C. or higher and 1,650° C. or lower.

The heat treatment time varies depending upon a temperature elevation rate, a heat treatment atmosphere, and so on, and after reaching the heat treatment temperature, the heat treatment time is preferably 1 hour or more, more preferably 2 hours or more, and still more preferably 3 hours or more, and preferably 20 hours or less, more preferably 18 hours or less, and still more preferably 15 hours or less.

As for the atmosphere where the raw material mixture is heat-treated, the heat treatment can be performed in an inert atmosphere of argon, nitrogen, a reducing atmosphere containing hydrogen, or an oxidizing atmosphere in the air. It is preferred that the raw material mixture is heat-treated in a nitrogen atmosphere having reducing properties to obtain a fluorescent material. The atmosphere where the raw material mixture is heat-treated is more preferably a hydrogen gas-containing nitrogen atmosphere having reducing properties.

In the fluorescent material having a composition of rare earth aluminum-gallate, the reactivity of the raw material mixture becomes good in an atmosphere having a high reducing power, such as a reducing atmosphere containing hydrogen and nitrogen, and can be heat-treated at atmospheric pressure without being pressurized. For the heat treatment, for example, an electric furnace, a gas furnace, and so on can be used.

The resulting fluorescent material may be wet dispersed and subjected to a post-treatment step, such as wet sieving, dehydration, drying, and dry sieving. According to such a post-treatment step, a fluorescent material having a desired average particle diameter is obtained. For example, the fluorescent material after the heat treatment is dispersed in a non-aqueous organic solvent or an aqueous solvent; a solvent flow is allowed to flow onto the dispersed fluorescent material on a sieve while applying a variety of vibrations via the sieve, thereby subjecting the calcined product to mesh passing to achieve wet sieving; and subsequently, dehydration, drying, and dry sieving are performed. There can be thus obtained the fluorescent material having a desired average particle diameter.

By dispersing the fluorescent material after the heat treatment in an aqueous medium, impurities, such as a calcination residue of the flux and unreacted components of the raw materials can be removed. For the wet dispersion, a dispersion medium, such as an alumina ball and a zirconia ball, may be used.

Light Emitting Device

Next, a light emitting device utilizing the resulting fluorescent material as a constituent element of a wavelength conversion member is explained. The light emitting device includes at least the aforementioned fluorescent material having an improved light emission intensity in the near-infrared region and an excitation light source.

For the excitation light source, a light emitting element can be used. The light emitting element is preferably one having a light emission peak wavelength in a wavelength range of 250 nm or more and 500 nm or less. The range of the light emission peak length of the light emitting element is more preferably in a wavelength range of 350 nm or more and 490 nm or less, and still more preferably in a wavelength range of 400 nm or more and 480 nm or less. By using such a light emitting element as the excitation light source and further using the fluorescent material having a maximum peak of a light emission spectrum in a near-infrared wavelength region of 780 nm to 1,600 nm according to an embodiment of the present disclosure, a light emitting device with an excellent light emission intensity in the near-infrared wavelength region can be provided.

A half-value width of the light emission spectrum of the light emitting element can be, for example, controlled to 30 nm or less.

For the light emitting element, a semiconductor light emitting element is preferably used. By using a semiconductor light emitting element as the light source, a stable light emitting device which is high in efficiency, high in linearity of an output against an input, and strong against a mechanical impact can be provided.

As the semiconductor light emitting element, a semiconductor light emitting device using, for example, a nitride-based semiconductor ($In_XAl_YGa_{1-X-Y}N$; $0 \leq X$, $0 \leq Y$, and $(X+Y) \leq 1$) can be used.

The fluorescent material which is included in the light emitting device is preferably a fluorescent material having the composition represented by the aforementioned formula (I), formula (II), formula (II-1), or formula (II-2). The fluorescent material which is included in the light emitting device is excited with light in a wavelength range of 250 nm or more and 500 nm or less. The light emitting device may be composed of, as a first fluorescent material, the aforementioned near-infrared light emitting fluorescent material and may include, in addition to this first fluorescent material, a second fluorescent material, and a combination of plural kinds of fluorescent materials may be used as the second fluorescent material.

The light emitting device can be configured by containing the fluorescent material having a maximum peak of a light emission spectrum in a near-infrared wavelength region of 780 nm to 1,600 nm in, for example, a fluorescent member covering the excitation light source. In the light emitting device in which the excitation light source is covered by the fluorescent member containing the near-infrared light emitting fluorescent material, a part of light emitted from the excitation light source is absorbed on the near-infrared light emitting fluorescent material, whereby light in the near-infrared wavelength region with an improved light emission intensity is radiated. By using the excitation light source emitting light in a wavelength range of 250 nm or more and 500 nm or less, the fluorescent material according to an embodiment of the present disclosure utilizes the radiated light more effectively utilized, whereby the light in the near-infrared region with an improved light emission intensity can be emitted.

It is preferred that the light emitting device contains the second fluorescent material which is different in the light emission peak wavelength from the first fluorescent material that is the near-infrared light emitting fluorescent material. For example, when the light emitting device suitably includes the light emitting element, the first fluorescent material which is excited with this and has an excellent light emission intensity in the near-infrared region, and the second fluorescent material which is different in the wavelength region to be emitted, light in a broad wavelength region can be emitted.

The second fluorescent material may be a fluorescent material capable of absorbing the light from the light emitting element and wavelength-converting it into light having a different wavelength. For example, the second fluorescent material is preferably one selected from a nitride-based fluorescent material mainly activated with a lanthanide series element, such as Eu and Ce; an oxynitride-based fluorescent material; a sialon-based fluorescent material; an alkaline earth halogen apatite fluorescent material mainly activated with a lanthanide series element, such as Eu, or a transition metal series element, such as Mn; an alkaline earth metal halogen borate fluorescent material; an alkaline earth metal aluminate fluorescent material; an alkaline earth silicate; an alkaline earth sulfide; an alkaline earth thiogallate; an alkaline earth silicon nitride; a germinate; a rare earth aluminate mainly activated with a lanthanide series element, such as Ce; a rare earth silicate; an organic material mainly activated with a lanthanide series element, such as Eu; an organic complex.

By using such a fluorescent material alone or in combination of two or more thereof together with the near-infrared light emitting fluorescent material, in addition to blue, green, yellow, red, and so on, color tints that are neutral colors thereof, such as blue-green, yellow-green, and orange, can be realized.

The near-infrared light emitting fluorescent material can constitute a fluorescent member covering the light emitting element together with the second fluorescent material and a sealing resin, as the need arises. Examples of a resin which constitutes the fluorescent member may include thermosetting resins, such as a silicone resin inclusive of a modified silicone resin, and an epoxy resin.

The fluorescent member may further contain, in addition to the resin and the fluorescent material, a filler, a light diffusing material, and so on. For example, by containing a light diffusing material, the directivity from the light emitting element is mitigated, thereby enabling a viewing angle to be increased. Examples of the filler may include silica, titanium oxide, zinc oxide, zirconium oxide, alumina.

The light emitting device using the fluorescent material according to an embodiment of the present invention can be utilized for lighting systems having a snow melting function, sensor systems having a sensitivity in a near-infrared region in security systems, and lighting systems for plant growth or cultivation.

EXAMPLES

The present invention is hereunder specifically described by reference to the following Examples and Comparative Examples. The fluorescent materials of the Examples and the fluorescent materials of the Comparative Examples were evaluated as follows.

Relative Light Emission Intensity (%)

Figure 1:
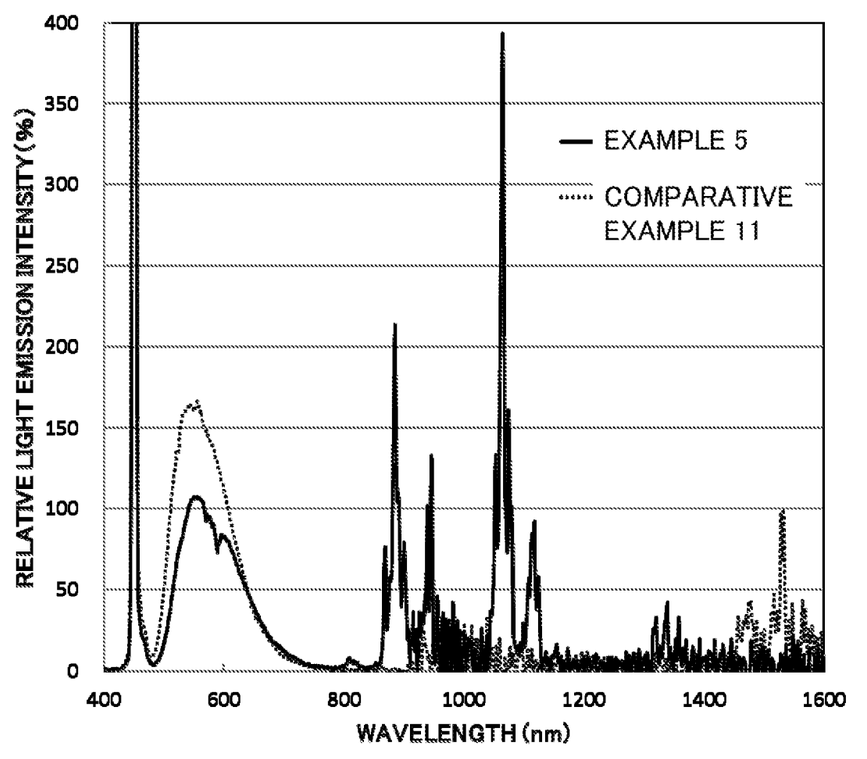
FIG. 1 is a diagram showing a light emission spectrum of a fluorescent material of an example according to an embodiment of the present disclosure and a light emission spectrum of a fluorescent material of a comparative example.

With respect to the fluorescent materials of the Examples and Comparative Examples, light was irradiated at an excitation wavelength of 450 nm, and a relative light emission intensity (PL Intensity) (%) to the wavelength was measured at room temperature (25° C.±5° C.) with a spectrofluorophotometer (QE-2000, manufactured by Otsuka Electronics Co., Ltd.). Light emission spectra of the fluorescent materials of Example 5 and Comparative Example 11 are shown in FIG. 1. FIG. 1 relatively shows the light emission intensity to the wavelength with respect to each of the fluorescent materials of Example 5 and Comparative Example 11, while making as a basis (i.e., 100) the light emission intensity of the fluorescent material of Comparative Example 11 at 1,532 nm, which is included in the near-infrared wavelength region (780 to 1,600 nm).

Light Emission Peak Relative Intensity (%)

A maximum value of the relative light emission intensity (%) in the near-infrared wavelength region was evaluated as the light emission peak relative intensity. That is, the light emission peak relative intensity of each of Examples 1 to 15 and Comparative Examples 1 to 10 was expressed in terms of a relative value (%), while making the maximum value of the relative light emission intensity of Comparative Example 11 as a basis (i.e., 100). In addition, with respect to the Examples and Comparative Examples, a wavelength (nm) at which the relative light emission intensity in the near-infrared wavelength region was measured and defined as a light emission peak wavelength (nm).

Example 1

55.664 g of $Y_2O_3$, 0.432 g of $CeO_2$, 1.184 g of $Nd_2O_3$, and 42.720 g of $Al_2O_3$ were weighed as raw materials. To the raw materials, 5.000 g of $BaF_2$ was added as a flux. These raw materials were dry mixed for 1 hour with a ball mill, to obtain a raw material mixture. The resulting raw material mixture was filled in an alumina crucible and heat-treated at 1,500° C. for 10 hours. The heat treatment was performed in a nitrogen atmosphere containing a hydrogen gas having reducing properties. The resulting heat-treated product was passed through a sieve, to obtain a fluorescent material having a composition of $(Y_{0.981}Ce_{0.005}Nd_{0.014})_3Al_5O_{12}$.

Example 2

A fluorescent material having a composition of $(Y_{0.9852}Ce_{0.005}Nd_{0.0098})_3Al_5O_{12}$ was obtained in the same manner as in Example 1, except for using 55.968 g of $Y_2O_3$, 0.433 g of $CeO_2$, 0.830 g of $Nd_2O_3$, and 42.770 g of $Al_2O_3$ as the raw materials.

Example 3

A fluorescent material having a composition of $(Y_{0.976}Ce_{0.01}Nd_{0.014})_3Al_5O_{12}$ was obtained in the same manner as in Example 1, except for using 55.298 g of $Y_2O_3$, 0.864 g of $CeO_2$, 1.182 g of $Nd_2O_3$, and 42.656 g of $Al_2O_3$ as the raw materials.

Example 4

A fluorescent material having a composition of $(Y_{0.971}Ce_{0.015}Nd_{0.014})_3Al_5O_{12}$ was obtained in the same manner as in Example 1, except for using 55.171 g of $Y_2O_3$, 0.866 g of $CeO_2$, 1.185 g of $Nd_2O_3$, and 42.778 g of $Al_2O_3$ as the raw materials.

Comparative Example 1

A fluorescent material having a composition of $(Y_{0.98595}Ce_{0.00005}Nd_{0.014})_3Al_5O_{12}$ was obtained in the same manner as in Example 1, except for using 56.027 g of $Y_2O_3$, 0.004 g of $CeO_2$, 1.186 g of $Nd_2O_3$, and 42.783 g of $Al_2O_3$ as the raw materials.

Comparative Example 2

A fluorescent material having a composition of $(Y_{0.985}Ce_{0.001}Nd_{0.014})_3Al_5O_{12}$ was obtained in the same manner as in Example 1, except for using 55.957 g of $Y_2O_3$, 0.087 g of $CeO_2$, 1.185 g of $Nd_2O_3$, and 42.771 g of $Al_2O_3$ as the raw materials.

Comparative Example 3

A fluorescent material having a composition of $(Y_{0.9835}Ce_{0.0025}Nd_{0.014})_3Al_5O_{12}$ was obtained in the same manner as in Example 1, except for using 55.847 g of $Y_2O_3$, 0.216 g of $CeO_2$, 1.185 g of $Nd_2O_3$, and 42.752 g of $Al_2O_3$ as the raw materials.

Comparative Example 4

A fluorescent material having a composition of $(Y_{0.966}Ce_{0.02}Nd_{0.014})_3Al_5O_{12}$ was obtained in the same manner as in Example 1, except for using 54.569 g of $Y_2O_3$, 1.722 g of $CeO_2$, 1.179 g of $Nd_2O_3$, and 42.530 g of $Al_2O_3$ as the raw materials.

Comparative Example 5

A fluorescent material having a composition of $(Y_{0.960}Ce_{0.02}Nd_{0.02})_3Al_5O_{12}$ was obtained in the same manner as in Example 1, except for using 54.140 g of $Y_2O_3$, 1.719 g of $CeO_2$, 1.681 g of $Nd_2O_3$, and 42.459 g of $Al_2O_3$ as the raw materials.

Comparative Example 6

A fluorescent material having a composition of $(Y_{0.956}Ce_{0.03}Nd_{0.014})_3Al_5O_{12}$ was obtained in the same manner as in Example 1, except for using 53.949 g of $Y_2O_3$, 2.570 g of $CeO_2$, 1.172 g of $Nd_2O_3$, and 42.309 g of $Al_2O_3$ as the raw materials.

Comparative Example 7

A fluorescent material having a composition of $(Y_{0.946}Ce_{0.04}Nd_{0.014})_3Al_5O_{12}$ was obtained in the same manner as in Example 1, except for using 53.125 g of $Y_2O_3$, 3.424 g of $CeO_2$, 1.172 g of $Nd_2O_3$, and 42.280 g of $Al_2O_3$ as the raw materials.

Comparative Example 8

A fluorescent material having a composition of $(Y_{0.931}Ce_{0.055}Nd_{0.014})_3Al_5O_{12}$ was obtained in the same manner as in Example 1, except for using 52.052 g of $Y_2O_3$, 4.687 g of $CeO_2$, 1.166 g of $Nd_2O_3$, and 42.094 g of $Al_2O_3$ as the raw materials.

Comparative Example 9

A fluorescent material having a composition of $(Y_{0.886}Ce_{0.1}Nd_{0.014})_3Al_5O_{12}$ was obtained in the same manner as in Example 1, except for using 48.891 g of $Y_2O_3$, 8.412 g of $CeO_2$, 1.151 g of $Nd_2O_3$, and 41.546 g of $Al_2O_3$ as the raw materials.

Comparative Example 10

A fluorescent material having a composition of $(Y_{0.786}Ce_{0.2}Nd_{0.014})_3Al_5O_{12}$ was obtained in the same manner as in Example 1, except for using 42.154 g of $Y_2O_3$, 16.350 g of $CeO_2$, 1.119 g of $Nd_2O_3$, and 40.377 g of $Al_2O_3$ as the raw materials.

Comparative Example 11

A fluorescent material having a composition of $(Y_{0.976}Ce_{0.01}Nd_{0.014})_3Al_5O_{12}$ was obtained in the same manner as in Example 1, except for using 55.682 g of $Y_2O_3$, 0.871 g of $CeO_2$, 0.451 g of $Er_2O_3$, and 42.996 g of $Al_2O_3$ as the raw materials.

Table 1 shows the light emission peak relative intensity (%) and the light emission peak wavelength (nm) of each of Examples 1 to 4 and Comparative Examples 1 to 11 in the near-infrared wavelength region of 780 to 1,600 nm.

TABLE 1

|  | Composition | Light emission peak relative intensity (%) | Light emission peak wavelength (nm) |
|---|---|---|---|
| Comparative Example 1 | $(Y_{0.98595}Ce_{0.00005}Nd_{0.014})_3Al_5O_{12}$ | 150 | 1065 |
| Comparative Example 2 | $(Y_{0.985}Ce_{0.001}Nd_{0.014})_3Al_5O_{12}$ | 263 | 1065 |
| Comparative Example 3 | $(Y_{0.9835}Ce_{0.0025}Nd_{0.014})_3Al_5O_{12}$ | 313 | 1065 |
| Example 1 | $(Y_{0.981}Ce_{0.005}Nd_{0.014})_3Al_5O_{12}$ | 383 | 1065 |
| Example 2 | $(Y_{0.9852}Ce_{0.005}Nd_{0.0098})_3Al_5O_{12}$ | 377 | 1065 |
| Example 3 | $(Y_{0.976}Ce_{0.01}Nd_{0.014})_3Al_5O_{12}$ | 360 | 1065 |
| Example 4 | $(Y_{0.971}Ce_{0.015}Nd_{0.014})_3Al_5O_{12}$ | 343 | 1065 |

TABLE 1-continued

|  | Composition | Light emission peak relative intensity (%) | Light emission peak wavelength (nm) |
|---|---|---|---|
| Comparative Example 4 | $(Y_{0.966}Ce_{0.02}Nd_{0.014})_3Al_5O_{12}$ | 333 | 1065 |
| Comparative Example 5 | $(Y_{0.960}Ce_{0.02}Nd_{0.02})_3Al_5O_{12}$ | 300 | 1065 |
| Comparative Example 6 | $(Y_{0.956}Ce_{0.03}Nd_{0.014})_3Al_5O_{12}$ | 333 | 1065 |
| Comparative Example 7 | $(Y_{0.946}Ce_{0.04}Nd_{0.014})_3Al_5O_{12}$ | 333 | 1065 |
| Comparative Example 8 | $(Y_{0.931}Ce_{0.055}Nd_{0.014})_3Al_5O_{12}$ | 327 | 1065 |
| Comparative Example 9 | $(Y_{0.886}Ce_{0.1}Nd_{0.014})_3Al_5O_{12}$ | 280 | 1065 |
| Comparative Example 10 | $(Y_{0.786}Ce_{0.2}Nd_{0.014})_3Al_5O_{12}$ | 210 | 1065 |
| Comparative Example 11 | $(Y_{0.976}Ce_{0.01}Er_{0.014})_3Al_5O_{12}$ | 100 | 1532 |

As shown in Table 1, in the fluorescent materials of Examples 1 to 4, the parameter x of the molar ratio of Ce (the product of 3 and a value of the parameter x) is in a range of 0.003 or more and 0.015 or less, and the parameter y of the molar ratio of Nd (the product of 3 and a value of the parameter y) is in a range of 0.005 or more and 0.030 or less. The fluorescent materials of Examples 1 to 4 were excited with light having a light emission peak wavelength of 450 nm, and the light emission peak relative intensity thereof at the light emission peak wavelength of 1,065 nm was 340% or more and was higher than that of Comparative Examples 1 to 3 in which the parameter x is less than 0.003 and Comparative Examples 4 to 10 in which the parameter x is 0.02 or more, and thus, the light emission intensity in the near-infrared region was high.

Example 5

A fluorescent material having a composition of $(Y_{0.7808}Gd_{0.1952}Ce_{0.01}Nd_{0.014})_3Al_5O_{12}$ was obtained in the same manner as in Example 1, except for using 41.462 g of $Y_2O_3$, 16.641 g of $Gd_2O_3$, 0.809 g of $CeO_2$, 1.108 g of $Nd_2O_3$, and 39.980 g of $Al_2O_3$ as the raw materials.

Example 6

A fluorescent material having a composition of $(Y_{0.8784}Gd_{0.0976}Ce_{0.01}Nd_{0.014})_3Al_5O_{12}$ was obtained in the same manner as in Example 1, except for using 48.156 g of $Y_2O_3$, 8.590 g of $Gd_2O_3$, 0.836 g of $CeO_2$, 1.144 g of $Nd_2O_3$, and 41.275 g of $Al_2O_3$ as the raw materials.

Example 7

A fluorescent material having a composition of $(Y_{0.5856}Gd_{0.3904}Ce_{0.01}Nd_{0.014})_3Al_5O_{12}$ was obtained in the same manner as in Example 1, except for using 29.260 g of $Y_2O_3$, 31.317 g of $Gd_2O_3$, 0.762 g of $CeO_2$, 1.042 g of $Nd_2O_3$, and 37.619 g of $Al_2O_3$ as the raw materials.

Example 8

A fluorescent material having a composition of $(Y_{0.7848}Lu_{0.1962}Ce_{0.005}Nd_{0.014})_3Al_5O_{12}$ was obtained in the same manner as in Example 1, except for using 41.046 g of $Y_2O_3$, 18.087 g of $Lu_2O_3$, 0.399 g of $CeO_2$, 1.091 g of $Nd_2O_3$, and 39.377 g of $Al_2O_3$ as the raw materials.

Example 9

A fluorescent material having a composition of $(Y_{0.926}Sc_{0.05}Ce_{0.01}Nd_{0.014})_3Al_5O_{12}$ was obtained in the same manner as in Example 1, except for using 53.050 g of $Y_2O_3$, 1.749 g of $Sc_2O_3$, 0.873 g of $CeO_2$, 1.195 g of $Nd_2O_3$, and 43.132 g of $Al_2O_3$ as the raw materials.

Example 10

A fluorescent material having a composition of $(Lu_{0.7848}Gd_{0.1962}Ce_{0.005}Nd_{0.014})_3Al_5O_{12}$ was obtained in the same manner as in Example 1, except for using 55.786 g of $Lu_2O_3$, 12.703 g of $Gd_2O_3$, 0.307 g of $CeO_2$, 0.841 g of $Nd_2O_3$, and 30.362 g of $Al_2O_3$ as the raw materials.

Example 11

A fluorescent material having a composition of $(Y_{0.976}Ce_{0.01}Nd_{0.014})_3(Al_{0.6}Ga_{0.4})_5O_{12}$ was obtained in the same manner as in Example 1, except for using 48.386 g of $Y_2O_3$, 0.756 g of $CeO_2$, 1.034 g of $Nd_2O_3$, 22.395 g of $Al_2O_3$, and 27.430 g of $Ga_2O_3$ as the raw materials.

Example 12

A fluorescent material having a composition of $(Y_{0.1952}Gd_{0.7808}Ce_{0.01}Nd_{0.014})_3Al_5O_{12}$ was obtained in the same manner as in Example 1, except for using 8.723 g of $Y_2O_3$, 42.456 g of $Gd_2O_3$, 0.681 g of $CeO_2$, 0.932 g of $Nd_2O_3$, and 33.645 g of $Al_2O_3$ as the raw materials.

Example 13

A fluorescent material having a composition of $(Y_{0.976}Ce_{0.01}Nd_{0.014})_3(Al_{0.4}Ga_{0.6})_5O_{12}$ was obtained in the same manner as in Example 1, except for using 45.539 g of $Y_2O_3$, 0.711 g of $CeO_2$, 0.973 g of $Nd_2O_3$, 14.052 g of $Al_2O_3$, and 38.724 g of $Ga_2O_3$ as the raw materials.

Example 14

A fluorescent material having a composition of $(Lu_{0.976}Ce_{0.01}Nd_{0.014})_3Al_5O_{12}$ was obtained in the same manner as in Example 1, except for using 68.535 g of $Lu_2O_3$, 0.608 g of $CeO_2$, 0.832 g of $Nd_2O_3$, and 30.025 g of $Al_2O_3$ as the raw materials.

Example 15

A fluorescent material having a composition of $(Y_{0.926}La_{0.05}Ce_{0.01}Nd_{0.014})_3Al_5O_{12}$ was obtained in the same manner as in Example 1, except for using 51.815 g of $Y_2O_3$, 4.037 g of $La_2O_3$, 0.853 g of $CeO_2$, 1.167 g of $Nd_2O_3$, and 42.128 g of $Al_2O_3$ as the raw materials.

Table 2 shows the light emission peak relative intensity (%) and the light emission peak wavelength (nm) of each of Examples 5 to 15 and Comparative Example 11 in the near-infrared wavelength region of 780 to 1,600 nm.

TABLE 2

| | Composition | Light emission peak relative intensity (%) | Light emission peak wavelength (nm) |
|---|---|---|---|
| Example 5 | $(Y_{0.7808}Gd_{0.1952}Ce_{0.01}Nd_{0.014})_3Al_5O_{12}$ | 420 | 1065 |
| Example 6 | $(Y_{0.8784}Gd_{0.0976}Ce_{0.01}Nd_{0.014})_3Al_5O_{12}$ | 406 | 1065 |
| Example 7 | $(Y_{0.5856}Gd_{0.3904}Ce_{0.01}Nd_{0.014})_3Al_5O_{12}$ | 388 | 1065 |
| Example 8 | $(Y_{0.7848}Lu_{0.1962}Ce_{0.005}Nd_{0.014})_3Al_5O_{12}$ | 382 | 1065 |
| Example 9 | $(Y_{0.926}Sc_{0.05}Ce_{0.01}Nd_{0.014})_3Al_5O_{12}$ | 367 | 1065 |
| Example 10 | $(Lu_{0.7848}Gd_{0.1962}Ce_{0.005}Nd_{0.014})_3Al_5O_{12}$ | 356 | 1065 |
| Example 11 | $(Y_{0.976}Ce_{0.01}Nd_{0.014})_3(Al_{0.6}Ga_{0.4})_5O_{12}$ | 345 | 1063 |
| Example 12 | $(Y_{0.1952}Gd_{0.7808}Ce_{0.01}Nd_{0.014})_3Al_5O_{12}$ | 328 | 1065 |
| Example 13 | $(Y_{0.976}Ce_{0.01}Nd_{0.014})_3(Al_{0.4}Ga_{0.6})_5O_{12}$ | 321 | 1062 |
| Example 14 | $(Lu_{0.976}Ce_{0.01}Nd_{0.014})_3Al_5O_{12}$ | 313 | 1065 |
| Example 15 | $(Y_{0.926}La_{0.05}Ce_{0.01}Nd_{0.014})_3Al_5O_{12}$ | 307 | 1065 |
| Comparative Example 11 | $(Y_{0.976}Ce_{0.01}Er_{0.014})_3Al_5O_{12}$ | 100 | 1532 |

As shown in Table 2, the fluorescent materials of Examples 5 to 15 were excited with light having a light emission peak wavelength of 450 nm and exhibited a very high light emission intensity in the near-infrared region such that the light emission peak relative intensity at a light emission peak wavelength of 1,062 to 1,065 nm in the near-infrared region was 3 times or more the relative light emission intensity (100) at the light emission peak wavelength of the fluorescent material of Comparative Example 11 at 1,532 nm. In the fluorescent materials of Examples 5 to 9, the molar ratio of Y is larger than the molar ratio of Gd, Sc, or Lu. In addition, in the fluorescent material of Example 10, the molar ratio of Lu is larger than the molar ratio of Gd. In these Examples 5 to 10, the light emission peak relative intensity became higher than that in Example 12 in which the molar ratio of Y is smaller than the molar ratio of Gd, and the light emission intensity was high in the near-infrared region. In particular, in Examples 5, 6, and 7 in which w of the molar ratio of Gd (the product of 3 and a value of the parameter w) is in a range of 0.01 or more and 0.5 or less, the light emission peak relative intensity was higher than that in Example 12 and other Examples in which the parameter w is more than 0.5, and thus, the light emission intensity in the near-infrared region was very high.

FIG. 1 is a diagram showing a relationship in the light emission spectrum (the wavelength and the relative light emission intensity (%)) between the fluorescent material of Example 5 and the fluorescent material of Comparative Example 11 as excited with light having the light emission peak wavelength of 450 nm. As shown in FIG. 1, the fluorescent material of Example 5 was excited with light having a light emission peak wavelength of 450 nm, and exhibited a very high light emission intensity at 1,065 nm that is in the near-infrared region. On the other hand, the fluorescent material of Comparative Example 11 exhibited a very low light emission intensity at 1,532 nm that is in the near-infrared region, as compared with the fluorescent material of Example 5.

In accordance with an embodiment of the present invention, it is possible to provide a fluorescent material having a composition of rare earth aluminum-gallate, with improved light emission intensity in a near-infrared region. The light emitting device using this fluorescent material can be utilized for lighting systems having a snow melting function, sensor systems having a sensitivity in a near-infrared region in security systems or the like, lighting systems for plant growth or cultivation, and so on.

Although the present disclosure has been described with reference to several exemplary embodiments, it shall be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

What is claimed is:

1. A light emitting device comprising a light emitting element having a light emission peak wavelength in a wavelength range of 400 nm or more and 480 nm or less and a fluorescent material comprising a rare earth aluminate, the fluorescent material comprising:
two kinds of rare earth elements Ln1 and Ln2;
Ce; and
Nd, wherein
the rare earth element Ln1 is Y,
the rare earth element Ln2 is Gd,
when a total molar ratio 5 of Al is used as a basis, a total molar ratio of Ln1, Ln2, Ce, and Nd is 3,
a molar ratio of the rare earth element Ln2 is a product of 3 and a parameter w;
a molar ratio of Ce is a product of 3 and a parameter x,
a molar ratio of Nd is a product of 3 and a parameter y,
the parameter w is in a range of 0.03 or more and 0.3904 or less,
the parameter x is in a range of 0.003 or more and 0.015 or less,
the parameter y is in a range of 0.002 or more and 0.030 or less, and
the fluorescent material has a maximum peak of a light emission spectrum in a near-infrared wavelength region of 780 nm to 1,600 nm.

2. The light emitting device according to claim 1, wherein
the parameter w is in a range of 0.03 or more and 0.3904 or less;
the parameter x is in a range of 0.004 or more and 0.012 or less; and
the parameter y is in a range of 0.004 or more and 0.030 or less.

3. A light emitting device comprising a light emitting element having a light emission peak wavelength in a wavelength range of 400 nm or more and 480 nm or less and a fluorescent material having a composition represented by the following formula (II-1):

$$(Ln1_{1-w-x-y}Ln2_wCe_xNd_y)_3Al_5O_{12} \qquad \text{(II-1)}$$

wherein Ln1 is Y; Ln2 is Gd; and w, x, and y each are numbers satisfying $0.03 \leq w \leq 0.3904$, $0.003 \leq x \leq 0.015$, and $0.002 \leq y \leq 0.030$, and
wherein the fluorescent material has a maximum peak of a light emission spectrum in a near-infrared wavelength region of 780 nm to 1,600 nm.

4. The light emitting device according to claim 3, wherein $0.03 \leq w \leq 0.3904$, $0.004 \leq x \leq 0.012$, and $0.004 \leq y \leq 0.030$.

5. The light emitting device of claim 1, wherein a half-value width of a light emission spectrum of the light emitting element is 30 nm or less.

6. The light emitting device of claim 3, wherein a half-value width of a light emission spectrum of the light emitting element is 30 nm or less.

7. The light emitting device of claim 5, wherein the fluorescent material has a maximum peak of a light emission spectrum in a near-infrared wavelength region of 1062 nm to 1065 nm.

8. The light emitting device of claim 6, wherein the fluorescent material has a maximum peak of a light emission spectrum in a near-infrared wavelength region of 1062 nm to 1065 nm.

* * * * *